United States Patent
Farquhar et al.

(10) Patent No.: US 6,789,845 B2
(45) Date of Patent: Sep. 14, 2004

(54) VEHICLE SEAT HAVING ACTIVE HEAD RESTRAINT SYSTEM

(75) Inventors: Mark Farquhar, Ortonville, MI (US); Ken McQueen, Leonard, MI (US); Mladen Humer, Eastpointe, MI (US); Dale Smallwood, Clarkston, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/260,990

(22) Filed: Sep. 30, 2002

(65) Prior Publication Data

US 2004/0061362 A1 Apr. 1, 2004

(51) Int. Cl.⁷ .................................................. B60N 2/42
(52) U.S. Cl. .................................. 297/216.12; 297/408
(58) Field of Search .......................... 297/216.12, 216.13, 297/216.14, 216.1, 408, 61, 284.4, 284.1, 452.13, 452.18, 216.17, 391

(56) References Cited

U.S. PATENT DOCUMENTS

| | | | | |
|---|---|---|---|---|
| 5,722,722 A | | 3/1998 | Massara ................. | 297/216.13 |
| 5,772,280 A | | 6/1998 | Massara ................. | 297/216.12 |
| 5,868,466 A | * | 2/1999 | Massara et al. .......... | 297/284.6 |
| 5,884,968 A | | 3/1999 | Massara ................. | 297/216.12 |
| 5,938,279 A | | 8/1999 | Schubring et al. ....... | 297/216.12 |
| 6,036,266 A | | 3/2000 | Massara ................. | 297/328 |
| 6,199,947 B1 | | 3/2001 | Wiklund ................. | 297/216.12 |
| 6,213,549 B1 | * | 4/2001 | Wieclawski ............. | 297/216.13 |
| 6,340,206 B1 | * | 1/2002 | Andersson et al. ....... | 297/216.14 |
| 6,398,299 B1 | * | 6/2002 | Angerer et al. ......... | 297/216.12 |
| 6,416,127 B1 | | 7/2002 | Galbreath, Jr. et al. . | 297/216.13 |
| 6,565,150 B2 | * | 5/2003 | Fischer et al. .......... | 297/216.12 |
| 6,604,788 B1 | * | 8/2003 | Humer .................. | 297/216.13 |

* cited by examiner

Primary Examiner—Peter M. Cuomo
Assistant Examiner—Stephen Vu
(74) Attorney, Agent, or Firm—Bliss McGlynn, P.C.; Bill Panagos

(57) ABSTRACT

A vehicle seat assembly including a seatback frame and an active head restraint system including a headrest, upper armature, lower armature and linkage operatively interconnecting the upper and lower armatures. In the event of a rearward impact, the lower armature is operable to absorb energy generated at the pelvic and lumbar regions and to cause the headrest to pivot upwardly and forwardly toward the head of the occupant through interaction with the upper armature and the link. Similarly, the upper armature is further operable to absorb energy generated at the thoracic region to activate the headrest following the initial response by the lower armature.

20 Claims, 7 Drawing Sheets

VEHICLE SEAT HAVING ACTIVE HEAD RESTRAINT SYSTEM

BACKGROUND OF THE INVENTION

1. Field of the Invention

The present invention relates, generally, to a vehicle seat, and more specifically to a vehicle seat having an active head restraint system.

2. Description of the Related Art

Conventional vehicle seat designs of the type commonly found in the related art typically include a seatback assembly, a lower seat assembly, recliner mechanism, manual or power adjustment mechanism for adjusting a number of positions of either the seatback or lower seat assemblies, as well as a number of safety features including occupant restraint devices such as seatbelts. The seatback assembly also includes a headrest that is typically mounted at the top or upper end of the seatback.

In the context of vehicle seating design, there is an ongoing effort to improve the safety of the vehicle occupant in the event of a collision. More specifically, there continues to be an ongoing effort to provide safety mechanisms that reduce the chance of injury in the region of the passengers' neck. In the event of a rearward impact, the occupant is forced against the seat and can experience a very large energy pulse. In such circumstances, the pelvis and lumbar regions of the occupant generally exert more force, initially, on the seatback than do the thoracic or shoulder regions of the occupant. This initial load may cause a separation between the seatback and the thoracic, neck, and head regions of the occupant. Depending on the force of the rear impact, this separation can be quickly and violently closed by a following movement of the upper torso, neck, and head of the passenger toward the seatback in an event commonly known as "whiplash." Thus, there has been an ongoing effort to address this problem in the context of vehicle seating safety.

In the past, the headrest was a relatively static device that was typically moveable up and down or slightly tiltable, but usually in connection with adjustments made for the comfort of any given occupant of the seat during normal driving conditions. However, in order to address the problems encountered during a rearward collision, dynamic or active headrest mechanisms have been proposed in the related art.

For example, U.S. Pat. No. 5,938,279 issued to Schubring et al. and assigned to the assignee of the present invention discloses a dynamic vehicle head restraint assembly that is designed to reduce the amount of separation between the occupant and the seatback in the event of a rearward collision. The head restraint assembly includes an impact or target plate that is supported by the seatback frame in the general area corresponding to the thoracic or shoulder region of the occupant. The impact plate is pivotally mounted to a linkage that is connected to the headrest. In the event of a rearward collision, the force of the occupant on the target plate actuates the linkage to cause the headrest to move upwardly and forwardly toward the head of the occupant, thereby reducing the amount of separation between the occupant and the seatback.

While the dynamic head restraint systems of the type known in the related art were an improvement over the previously known static headrests, there remains a need in the art to better absorb and dissipate the energy generated by the force acting on the seatback in the event of a rearward collision, especially at the pelvic and lumbar areas, which are generally remote from the headrest.

U.S. Pat. No. 6,565,150, assigned to the assignee of the present invention, discloses a vehicle seat having an active headrest that is designed to address this problem. More specifically, the seat has a pivotal support assembly that is mounted to the seatback frame and is operatively connected to the headrest such that the headrest moves upwardly and toward the occupant in the event of a rearward collision. The pivotal support assembly includes a lower impact target that is located in the pelvic and lumbar regions to dissipate the forces that are first translated to the seatback in this area. The lower target is operatively connected to a reaction plate that is pivotally mounted to the seatback. In turn, the headrest is mounted to the reaction plate.

While the dynamic head restraint systems known in the related art have generally worked for their intended purposes and have improved safety, there remains a need in the art for a vehicle seat having an active head restraint system that better absorbs the energy generated by the force at both the pelvic and lumbar regions as well as the force generated at the thoracic or shoulder regions of the occupant. This is especially true in the case of a smaller or narrower seat. Vehicle seats of this type generally inhibit penetration into the seatback at the shoulder region of the occupant in the event of a rearward collision. Furthermore, and as noted above, penetration at the shoulder area into the seatback occurs only after the initial penetration that occurs at the pelvic and lumbar regions of the occupant.

Over and above the need to deal with forces generated in the event of a rearward collision, there is an ongoing need in the related art for a vehicle seat that can withstand greater impacts and thereby provide better factors of safety for the vehicle occupant in the event, for example, of a side impact.

SUMMARY OF THE INVENTION

The present invention overcomes these disadvantages in the related art in a vehicle seat assembly that includes a seatback frame and an active head restraint system operatively supported by the seatback frame. The head restraint system includes a headrest, an upper armature, a lower armature, and a linkage operatively interconnecting the upper and lower armatures. The upper armature is pivotally mounted relative to the seatback so as to be generally aligned with the thoracic area of the occupant of the seat assembly. The headrest is operatively mounted to the upper armature. The lower armature is pivotally mounted to the frame in spaced relationship relative to upper armature so as to be generally aligned with the lumbar and pelvic regions of the occupant of the seat assembly. The lower armature is operative to absorb energy generated by a force exceeding a predetermined level at the pelvic and lumbar regions such that the lower armature acts on the upper armature through the linkage to cause the upper armature and the headrest to pivot upwardly and forwardly to move the headrest toward the head of the occupant of the seat assembly in an initial response to an impact exceeding a predetermined force. In addition, the upper armature is further operative to absorb energy generated by a force exceeding a predetermined level at the thoracic region such that the upper armature and the headrest pivots further upwardly and forwardly following the initial response by the lower armature to an impact that exceeds a predetermined force. In addition, the vehicle seat assembly may further include a side impact protection strut that increases the lateral stiffness of the seat and thereby improves side impact performance.

In this way, the vehicle seat assembly of the present invention provides a head restraint system that is responsive to forces that are first generated and imparted to the seatback in the lumbar and pelvic region of the seat occupant even though these regions are disposed relatively remote from the headrest. In addition, the head restraint system of the present invention also acts to absorb and dissipate the energy generated by the force of the occupant that impinges on the seatback near the thoracic or shoulder region of the occupant and acts to further move the headrest upwardly and toward the head of the occupant thereby reducing the separation that can occur between the occupant and the seatback in the event of a collision. Finally, the vehicle seat assembly of the present invention addresses these specific problems in a system that is efficient, robust, and cost effective.

Other advantages of the invention will be readily appreciated as the same becomes better understood by reference to the following detailed description when considered in connection with the accompanying drawings, wherein:

DETAILED DESCRIPTION OF THE PREFERRED EMBODIMENT(S)

Figure 1:
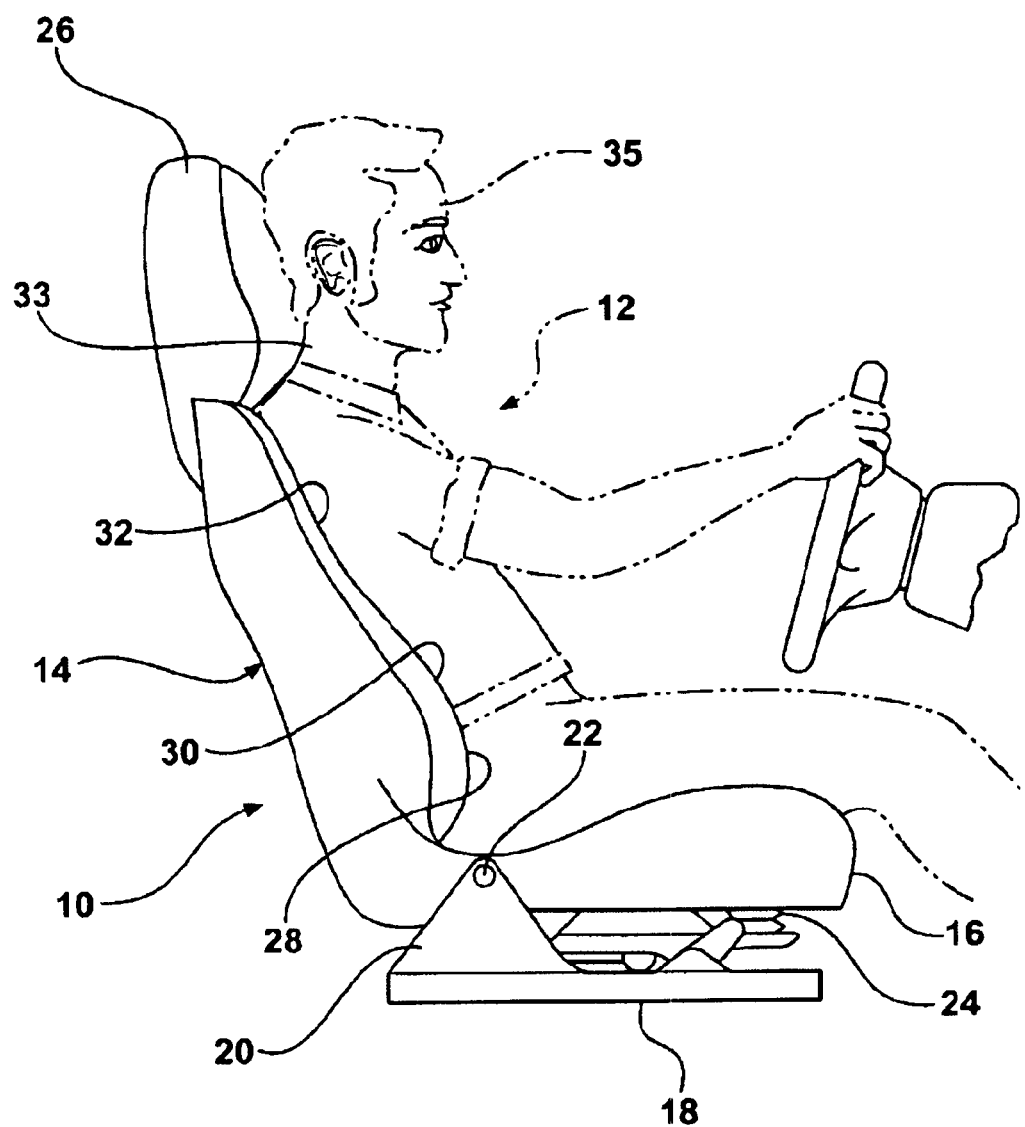
FIG. 1 is in elevational side view of a vehicle seat of the type that may include an active head restraint system of the present invention illustrated in relation to a schematically shown occupant of the vehicle seat.

Referring now to the drawings, where like numerals are used to designate like structure throughout the figures, a vehicle seat of the type that may employ the active head restraint system of the present invention is generally indicated at 10 in FIG. 1. A theoretical "occupant" is schematically indicated at 12 and is shown in what could be referred to as a "normal driving position." The vehicle seat 10 includes a seatback, generally indicated at 14, a lower seat assembly, generally indicated at 16 that is supported on a seat track 18, as is commonly known in the art. The seatback 14 may be pivotally connected to the lower seat assembly 16 by means of a bracket 20 via pivot point 22 that forms a part of the seat track mechanism 18. In this way, the seat assembly 10 may be adapted to recline or adjust in a number of ways that are commonly known in the art, but which form no part of the present invention. Furthermore, the lower seat assembly 16 may also include some sort of suspension or support mechanism 24 that adds comfort to the occupant, as is also well known in the art. In addition to these common elements, the seat assembly 10 of the present invention may include various controls and restraint systems, such as seatbelts, etc. that are not shown, but that are well known in the art.

A headrest 26 is located at the upper margins of the seatback 14. The occupant has a pelvis region 28, a lumbar region 30, and a thoracic region 32. In addition, the occupant 12 is shown having a neck 33 and head 35. The seatback 14 has similar regions which correspond to the relevant anatomical regions of the occupant 12. In the event of a rear impact, the forces that are generated can cause the occupant 12 to be driven toward the seatback 14. However, the initial forces act at the pelvic and lumbar regions 28, 30, respectively and, as indicated above, this phenomenon can cause a separation between the seatback 14 and the upper torso, thoracic or shoulder regions 32 of the occupant.

In order to address this problem, the vehicle seat assembly 10 includes a seatback frame, generally indicated at 34, and an active head restraint system, generally indicated at 36. One embodiment of the present invention is illustrated with respect to FIGS. 2–3. More specifically, and referring now to these figures, the active head restraint system 36 is operatively supported by the seatback frame 34 and includes the headrest 26, an upper armature 38, a lower armature 40, and a linkage 42 operatively interconnecting the upper and lower armatures 38, 40. The upper and lower armatures, 38, 40, as well as the linkage 42 will be described in greater detail below.

The upper armature 38 is pivotally mounted relative to the seatback frame 34 so that it is generally aligned with the thoracic region 32 of the occupant 12 of the seat assembly 10. The headrest 26 is operatively mounted to the upper armature 38 as will be described in greater detail below. Similarly, the lower armature 40 is pivotally mounted to the seatback frame 34 in spaced relationship relative to the upper armature 38 and so as to be generally aligned with the pelvic and lumbar regions 28, 30, respectively, of the occupant 12 of the seat assembly. In its operative mode, the lower armature 40 absorbs energy generated at the pelvic and lumbar regions 28, 30 by a force that exceeds a predetermined level. When this occurs, the lower armature 40 acts on the upper armature 38 through the linkage 42 to cause the upper armature 38 and the headrest 26 to pivot upwardly and forwardly so that the headrest 26 moves toward the head 35 of the occupant 12 of the seat assembly 10. In this way, the lower armature 40 acting on the upper armature 38 provides an initial and very fast response to an impact that exceeds a predetermined force. However, over and above the initial forces generated at the pelvic and lumbar regions 28, 30, the upper armature 38 further acts to absorb energy that is generated at the thoracic regions 32 by a force exceeding a predetermined level. In this event, the upper armature 38 and the headrest 26 pivots further upwardly and forwardly following the initial response by the lower armature 40 to an impact that exceeds the predetermined force.

The seatback frame 34 includes a pair of side members 44 that are spaced relative to one another as well as upper and lower cross members 46, 48, respectively, that extend between the pair of side members 44. The seatback frame 34 may have a "unibody" construction wherein the side members 44 as well as the upper and lower cross member 46, 48 are integrally formed. In addition, the seatback frame 34 may be assembled from separate components making up the side members 44 and upper and lower cross members 46, 48 that are then welded or otherwise permanently fixed to each other. Thus, and from the description that follows, those having ordinary skill in the art will appreciate that a number of different means of operatively interconnecting the components of the seatback frame 34 may be employed without departing from the scope of the present invention. The seatback frame 34 further includes a side impact protective strut, generally indicated at 50. The side impact protective strut generally extends transverse to the side members 44 in the space defined therebetween and is preferably disposed proximate to the lower cross member 48. In this way, the side impact protective strut provides added strength to the seat assembly 10 in the transverse direction relative to the side members 44 and in the lumbar region 30 relative to an occupant 12. Furthermore, in the embodiment illustrated in FIGS. 2–3, the side impact protective strut 50 includes a cross member 52 that is welded or otherwise permanently affixed to the lower armature 40 as will be described in greater detail below.

The lower armature 40 includes a pair of upstanding tubes 54 and a lower suspension mechanism indicated in phantom at 56 extending between the pair of upstanding tubes 54. The lower suspension mechanism 56 provides lumbar support to the occupant 12 of the seat assembly 10. In addition, the lower suspension mechanism 56 acts to transfer forces generated in the pelvic and lumbar regions to the lower armature 40. Thus, the lower suspension mechanism 56 may take the form of a strap that extends between the upstanding tubes 54. This strap may be made of any suitable material including metal, plastic, or fabric. The lower armature 40 is pivotally connected to the lower cross member 48 about an axis "A" that extends between the side members 44 of the seatback frame 34. The lower armature 40 is also movable in a direction transverse to the axis "A" in the direction of the upper cross member 46 as will be described in greater detail below.

More specifically, in one embodiment illustrated in these figures, a sliding ball joint, generally indicated at 58, may be employed to interconnect the lower armature 40 of the head restraint system 36 and the lower cross member 48 of the seatback frame 34. In this case, the sliding ball joint 58 provides pivotal movement of the lower armature 40 about the axis "A" extending between the side members 44 as well as linear, sliding movement of the lower armature 40 relative to the lower cross member 48 and in the direction of the upper armature 38.

In order to facilitate this pivotal and linear sliding movement, the lower armature 40 may include a pair of fulcrum brackets 60 that are fixedly attached to the lower cross member 48. Each of the fulcrum brackets 60 presents a fulcrum bushing 62. The lower end of each of the upstanding tubes 54 include a ball that is cooperatively received within the bushing 62 so as to define the sliding ball joint 58.

The upper armature 38 includes a main support member 64 that extends in a generally transverse direction relative to the side member 44 of the seatback frame 34. In addition, the upper armature 38 includes a pair of depending tubular legs 66 that are disposed spaced relative to one another and that extend from the main support member 64 in the general direction of the lower armature 40. The upper armature 38 further includes an upper suspension mechanism 68 that extends between the depending legs 66 and provides thoracic support for the occupant 12 of the seat assembly 10. The upper suspension mechanism 68 acts to transfer forces generated in the thoracic, shoulder, or upper torso regions to the upper armature 38. The upper suspension mechanism 68 may include any device suitable for this purpose. As illustrated in these figures, the upper suspension mechanism 68 takes the form of a strap that may be made of metal, plastic, fabric or any other suitable material. In addition, the upper armature 38 includes a pair of upstanding tubular headrest supports 70 that are fixed to the main support member 64 in spaced relationship with respect to one another and that extend in the general direction of the upper cross member 46 of the seatback frame 34. The headrest 26 is operatively mounted to the pair of upstanding tubular headrest supports 70 for coordinated movement with the movement of the upper armature 38.

As noted above, the linkage 42 operatively interconnects the upper and lower armatures 38, 40. To this end, one embodiment of the linkage 42 includes a bracket 72 that is fixedly attached to the lower armature 40 and is pivotally attached to the upper armature 38. The interaction of the linkage 42 with the upper and lower armatures translates articulating movement from the lower armature 40 to the upper armature 38 and thus to the headrest 26. On the other hand, the upper armature 38 includes a pair of articulating brackets 74 that are disposed on either side of the upper armature 38. The brackets 74 serve to operatively interconnect the upper armature 38 and the side members 44 of the seatback frame 34. Each of the articulating brackets 74 include a first end 76 that is pivotally attached to a respective side member 44 for providing upwardly pivotal movement of the upper armature 38 relative to the seatback frame 34. In addition, each of the articulating brackets 74 include a second end 78 that is pivotally attached to a respective one of the depending legs 66 of the upper armature 38. The second end 78 of the articulating bracket 74 provides forward pivotal movement of the upper armature 38 relative to the seatback frame 34.

In this way, in the event of a rearward collision of sufficient force, the lower armature 40 acts to absorb the energy generated at the pelvic and lumbar regions and translates this energy to the upper armature 38 through the linkage 42. In response, the upper armature 38 and the headrest 62 pivot upwardly and forwardly through the action of the articulating brackets 74 thereby moving the headrest 26 toward the head 35 of the occupant 12. This is the initial response by the head restraint system 36 of the present invention. Thereafter, the upper armature 38 is further operable to absorb the energy generated at the thoracic region 32 such that the headrest 26 pivots further upwardly and forwardly by action of the articulating brackets 74 to close or otherwise eliminate any separation between the upper torso, neck, and head of the occupant 12 and the seatback 14. A biasing member 80 extends between each bracket 74 and the side members 44. The biasing member 80 may be of any known type, such as a coiled spring or any other suitable mechanism that acts to move the upper and lower armatures 38, 40 back to their initial position prior to impact.

Figure 3:
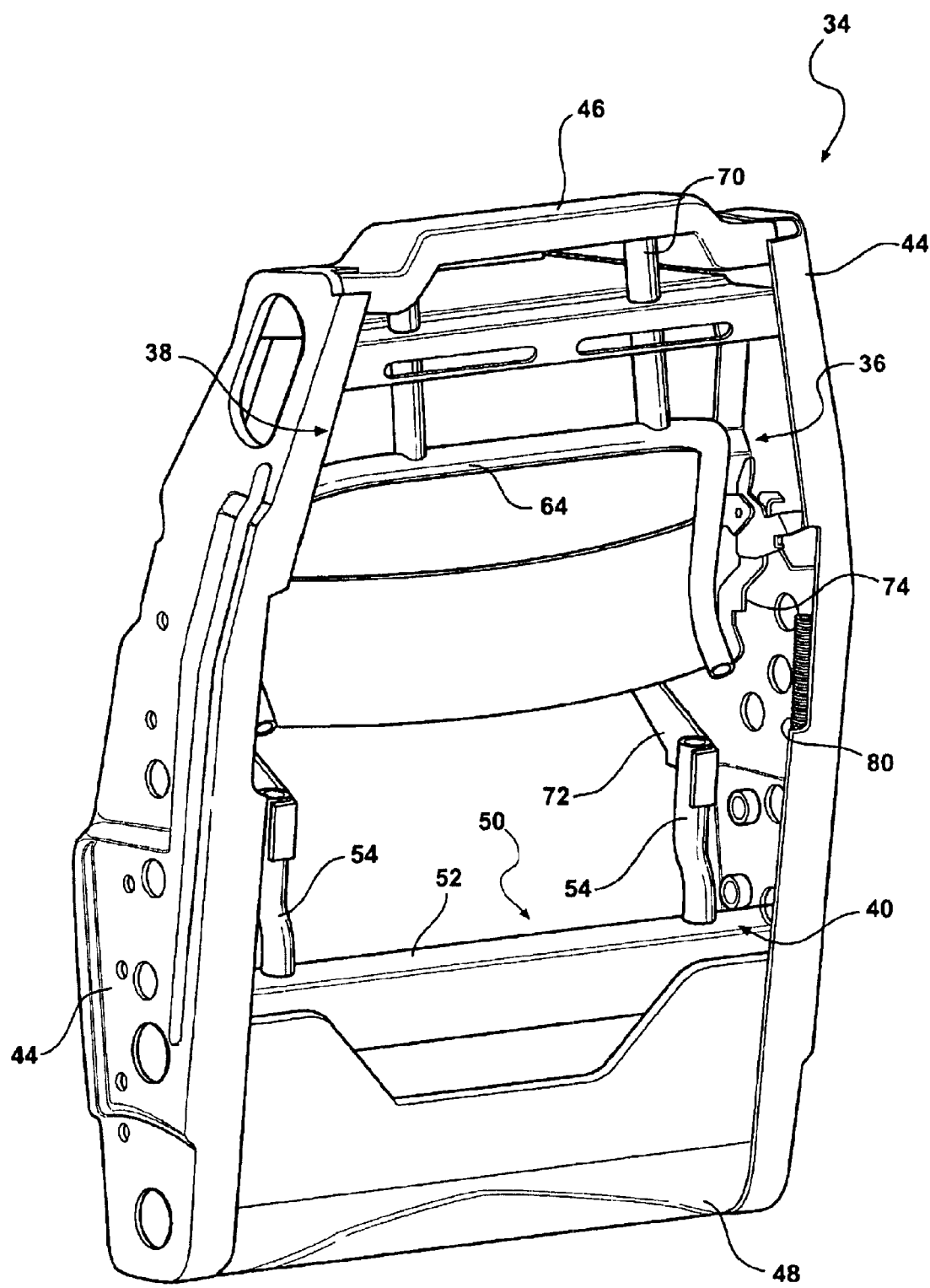
FIG. 3 is a rear elevational view of the seatback frame and active head restraint system shown in FIG. 1.
Figure 4:
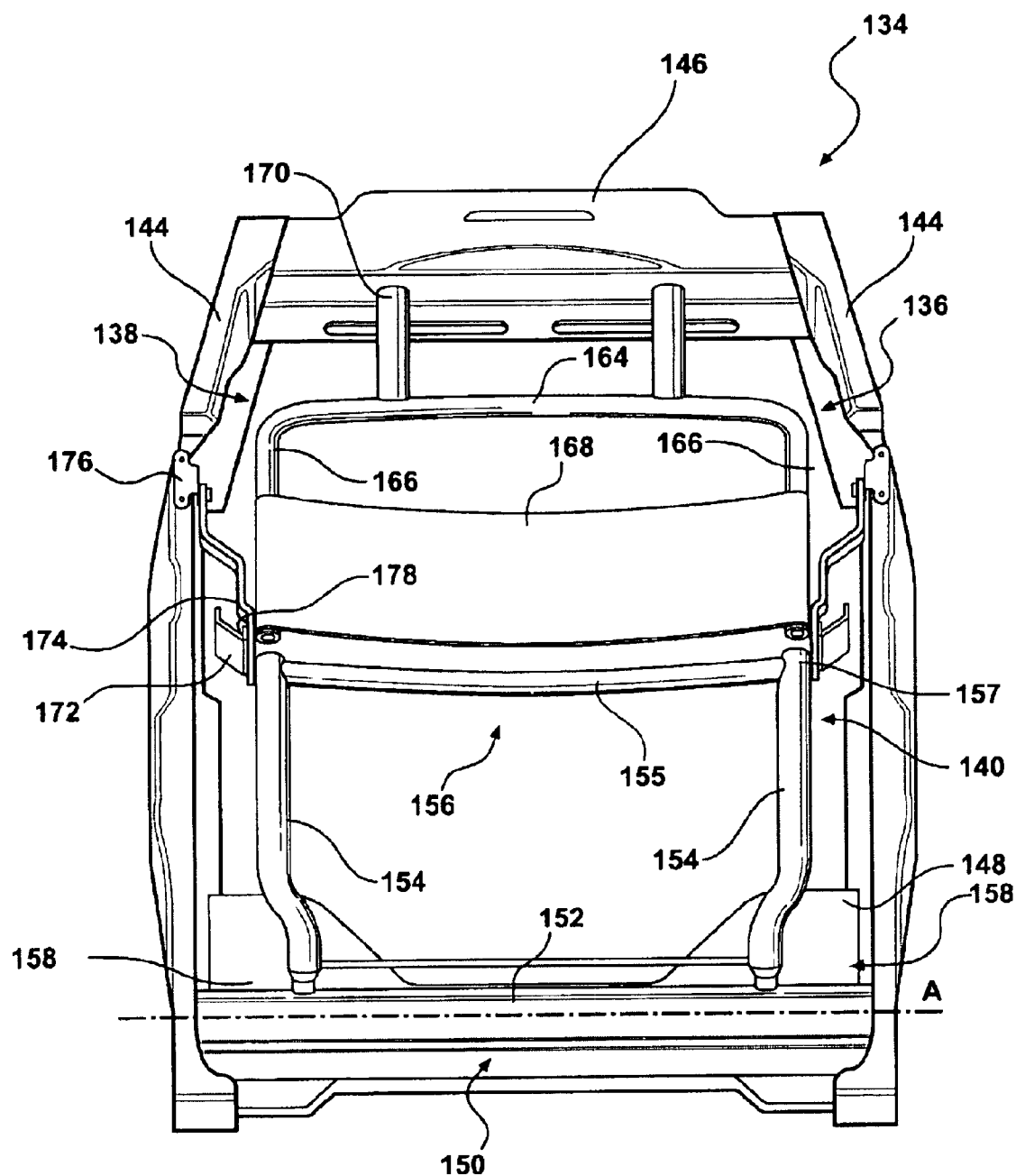
FIG. 4 is a front view of another embodiment of the seatback frame and active head restraint system of the present invention.
Figure 5:
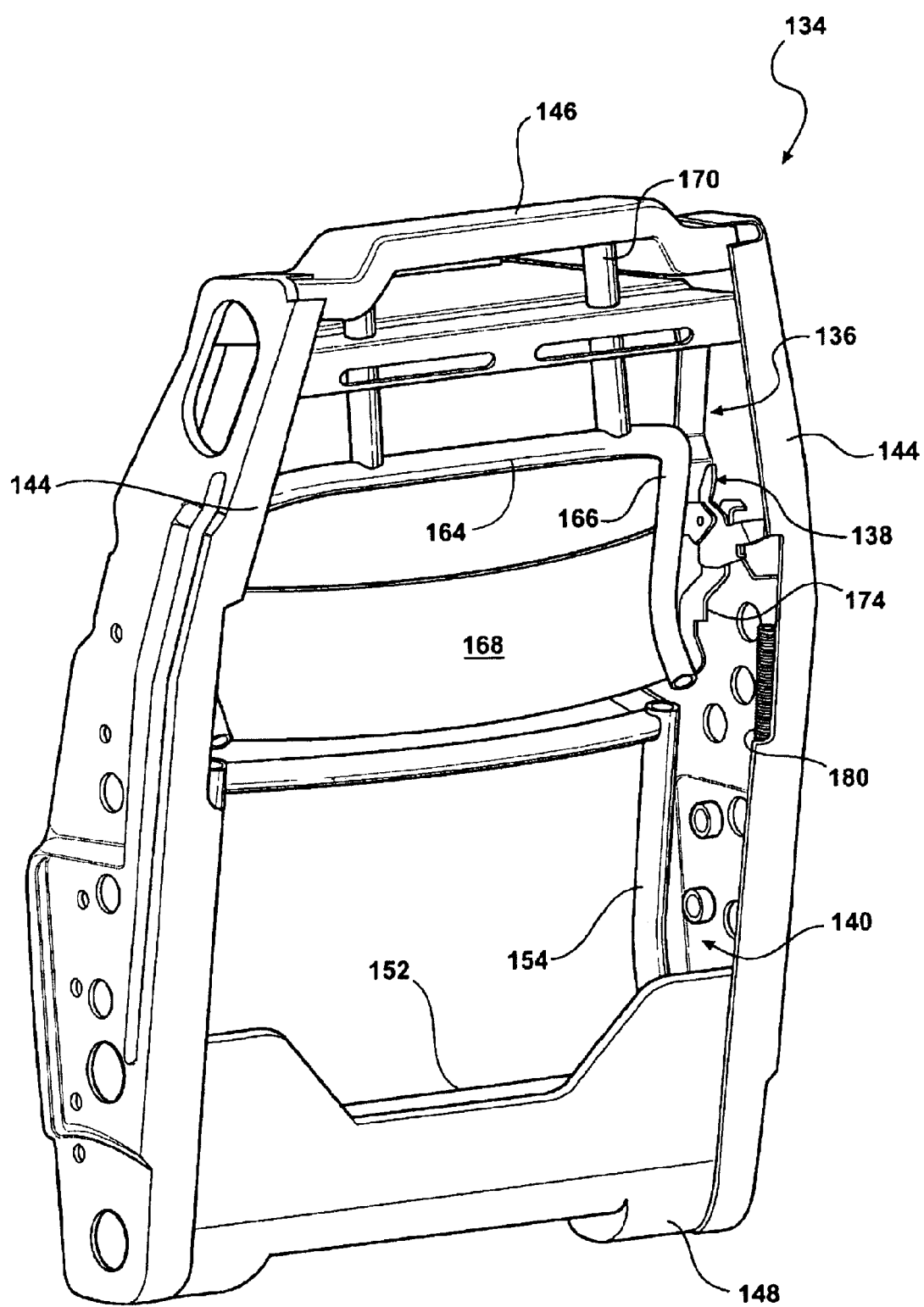
FIG. 5 is a rear elevational view of the seatback frame and active head restraint system illustrated in FIG. 4.

An alternate embodiment of the seatback frame and active head restraint system of the present invention is generally indicated at 134 and 136, respectively in FIGS. 4–5, where like numerals increased by 100 are used to designate like structure. The seatback frame 134 and active head restraint systems 136 shown in this alternate embodiment are substantially similar to the like components described with respect to FIGS. 2 and 3. Thus, the seatback frame 134 includes a pair of side members 144 that are spaced relative to one another and upper and lower cross members 146, 148, respectively, that extend between the side members 144. In addition, a side impact protective strut, generally indicated at 150, extends transverse to the side members 144 in the space therebetween and generally proximate to the lower cross member 148. In the embodiment illustrated in these figures, the side impact protective strut 150 includes a cross member 152 that is welded to the cross member 148 of the seatback frame 134. More specifically, the cross member 152 is welded generally to the bottom of the cross member 148 as opposed to the embodiment illustrated in FIGS. 2 and 3 where the cross member 52 is welded to the upstanding tubes 54 of the lower armature 40. In this particular embodiment, the cross member 152 may be a stamping that is welded to the bottom of the cross member 148 of the seatback frame 134 and thereby provides a fulcrum for the lower armature. In addition, in the embodiment illustrated in FIGS. 4–5, the lower armature 140 further includes an upper cross member 155 that extends between the upstanding tubes 154 at the terminal ends 157 of the tubes 154 opposite the cross member 148 of the seatback frame 134. The remaining components of the seatback frame 134 and active head restraint system 136 are substantially similar to the seatback frame 34 and head restraint system 36 illustrated in FIGS. 2–3. In addition, the active head restraint system 136 operates in the same manner as that described with respect to the like system 36 illustrated in FIGS. 2–3. Accordingly, the description of each component and the operation of the head restraint system will not be repeated here.

Figure 2:
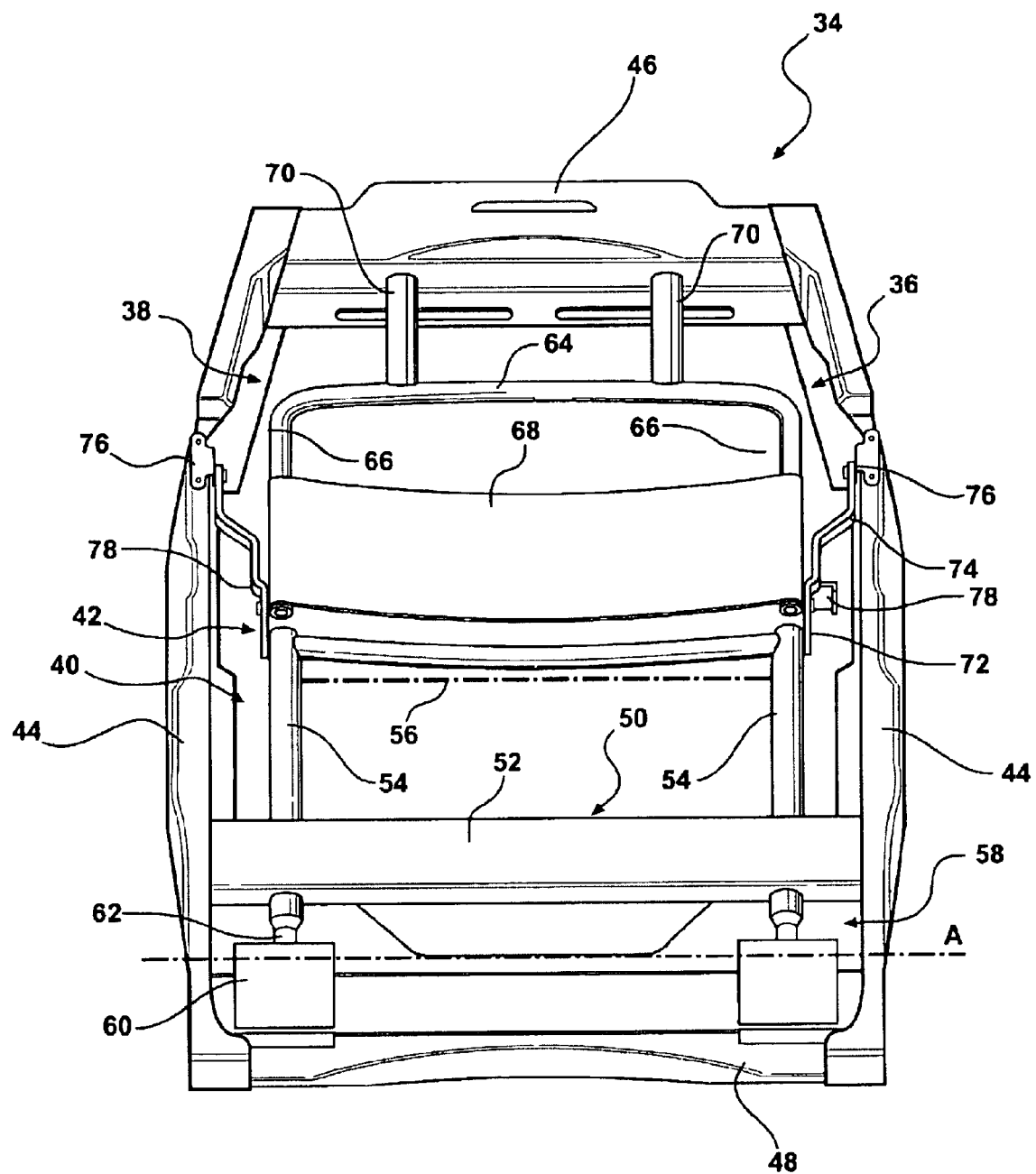
FIG. 2 is a front view of one embodiment of the seatback frame and active head restraint system of the present invention.
Figure 6:
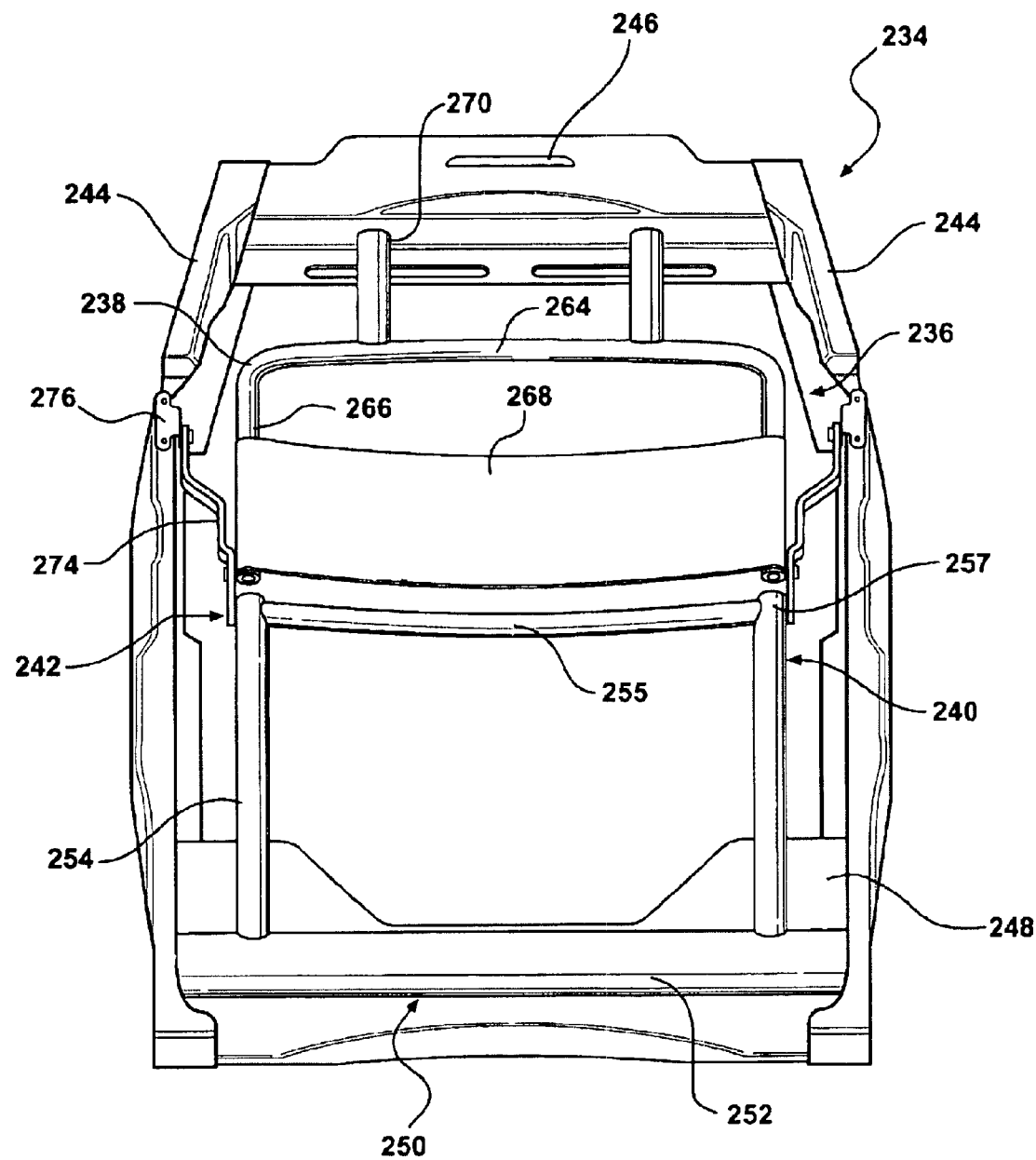
FIG. 6 is a front view of still another embodiment of the seatback frame and active head restraint system of the present invention.
Figure 7:
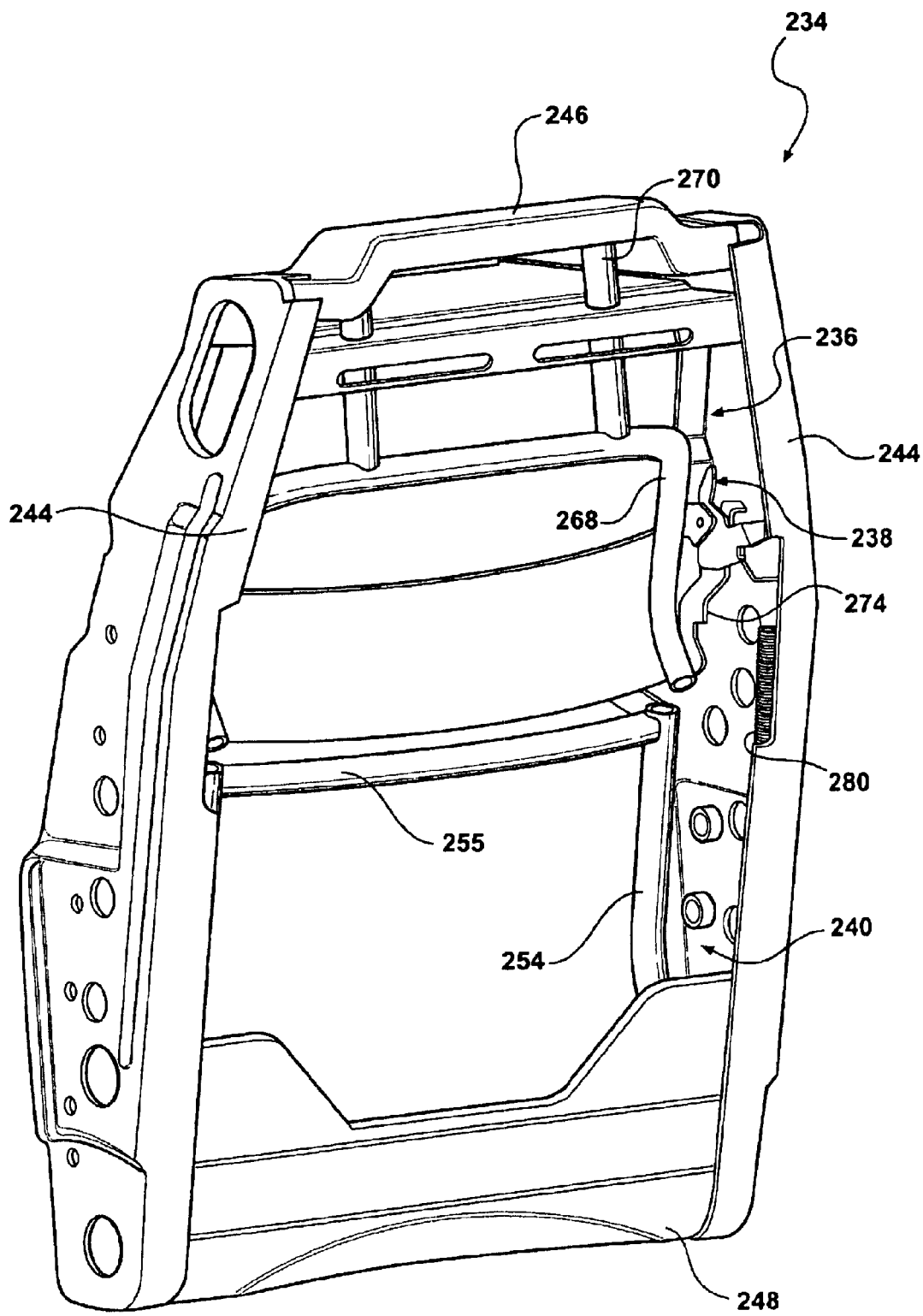
FIG. 7 is a rear elevational view of the seatback frame and active head restraint system illustrated in FIG. 6.

Another alternate embodiment of the vehicle seatback of the present invention is generally shown in FIGS. 6–7 where like numerals increased by 200 with respect to the embodiment illustrated in FIGS. 2–3 are used to designate like structure. Thus, the seatback frame 234 includes a pair of side members 244 that are spaced relative to one another and upper and lower cross members 246, 248, respectively, that extend between the side members 244. In the embodiment illustrated in FIGS. 6-7, the side impact protective strut 250 includes a cross member 252 that is pivotally mounted to the side member 244 of the seatback frame 234. In this embodiment, the cross member 252 is a tubular member that is rotatable about the axis "A" extending between the side members 244 of the seatback frame 234. The lower armature 240 is mounted by welding or any other suitable means commonly known in the art to the cross member 252 of the side impact protective strut 250. The linkage 242 includes a drag link for providing linear movement of the upper and lower armatures 238, 240 relative to each other. Thus, the seatback frame 234 and active head restraint system 236 illustrated in FIGS. 6–7 are substantially similar to the like components disclosed with respect to FIGS. 2–3. The only difference between the two embodiments is the elimination of the ball joint at the interconnection of the lower armature 40 to the lower cross member 248 of the seatback frame 234 and the addition of the upper cross member 255 extending between the upstanding tubes 254 at the terminal ends 257 thereof. In addition, the active head restraint system 236 operates in the same manner as that described with respect to the like system 36 illustrated in FIGS. 2–3. Accordingly, that explanation will not be repeated here.

The vehicle seat assembly of the present invention provides a head restraint system that is responsive to forces that are first generated and imparted to the seatback in the lumbar and pelvic region of the seat occupant even though these regions are disposed relatively remote from the headrest. In addition, the head restraint system of the present invention also acts to absorb, dissipate the energy generated by the force of the occupant that impinges on the seatback near the thoracic or shoulder region of the occupant and acts to further move the headrest upwardly and toward the head of the occupant thereby reducing the separation that can occur between the occupant and the seatback in the event of a collision. The upper and lower armatures act in concert to reduce or eliminate any separation between the occupant and the seatback. Over and above the improvements in dealing with the forces generated in the event of a rearward collision, in the preferred embodiment of the vehicle seat assembly of the present invention, a side impact protective strut is employed to increase the lateral stiffness of the seat and thereby improve seat impact performance. Finally, the vehicle seat assembly of the present invention addresses the specific problems known in the related art in a system that is efficient, robust, and cost effective.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention maybe practiced other than as specifically described.

We claim:

1. A vehicle seat assembly comprising:

a seatback frame and an active head restraint system operatively supported by said seatback frame, said head restraint system including a head rest, an upper armature, a lower armature and a linkage operatively interconnecting said upper and lower armatures;

said upper armature pivotally mounted relative to said seatback frame so as to be generally aligned with the thoracic area of the occupant of said seat assembly, said head rest being operatively mounted to said upper armature;

said lower armature pivotally mounted to said seatback frame in spaced relationship relative to said upper armature so as to be generally aligned with the pelvic and lumbar regions of the occupant of the seat assembly;

said lower armature being operative to absorb energy generated by a force exceeding a predetermined level at the pelvic and lumbar regions such that said lower armature acts on said upper armature through said linkage to cause said upper armature and said head rest to pivot upwardly and forwardly to move said head rest toward the head of the occupant of said seat assembly in an initial response to an impact exceeding a predetermined force; and said upper armature further operative to absorb energy generated by a force exceeding a predetermined level at the thoracic region such that said upper armature and said head rest pivots further upwardly and forwardly following the initial response by said lower armature to an impact that exceeds a predetermined force.

2. The vehicle seat assembly as set forth in claim 1 wherein said linkage includes a bracket fixedly attached to said lower armature and pivotally attached to said upper armature for translating articulated movement of said lower armature to said head rest through said upper armature.

3. The vehicle seat assembly as set forth in claim 1 wherein said seatback frame includes a pair of side members spaced relative to one another and upper and lower cross members extending therebetween, said seatback frame further including a side impact protective strut extending transverse to said side members in the space therebetween and proximate to said lower cross member for providing added strength to said seat assembly in the transverse direction relative to said side members and in the lumbar region relative to an occupant of said seat assembly.

4. The vehicle seat assembly as set forth in claim 3 wherein said side impact protective strut includes a cross member welded to said lower armature.

5. The vehicle seat assembly as set forth in claim 3 wherein said upper armature includes a pair of articulating brackets operatively interconnecting said upper armature and said side members of said seatback frame, each of said articulating brackets including a first end that is pivotally attached to said side member for providing upwardly pivotal movement of said upper armature relative to said seatback frame and a second end pivotally attached to said upper armature for providing forward pivotal movement of said upper armature relative to said seatback frame.

6. The vehicle seat assembly as set forth in claim 3 wherein said lower armature is pivotally connected to said lower cross member of said seatback frame about an axis extending between said side members of said seatback frame, said lower armature also being movable in a direction transverse to said axis in the direction of said upper cross member.

7. The vehicle seat assembly as set forth in claim 3 further including a sliding ball joint interconnecting said lower armature of said head restraint system and said lower cross member of said seatback frame, said sliding ball joint providing pivotal movement of said lower armature about an axis extending between said side members of said seatback frame and linear sliding movement of said lower armature relative to said lower cross member in the direction of said upper armature.

8. The vehicle seat assembly as set forth in claim 3 wherein said lower armature includes an pair of upstanding tubes and a lower suspension mechanism extending between said pair of upstanding tubes for providing lumbar support to the occupant of said seat assembly.

9. The vehicle seat assembly as set forth in claim 8 wherein said lower armature further includes an pair of fulcrum brackets fixedly attached to said lower cross member of said seatback frame, each of said fulcrum brackets presenting a fulcrum bushing, the lower end of each of said upstanding tubes including a ball that is cooperatively received within said bushing so as to define a sliding ball joint.

10. The vehicle seat assembly as set forth in claim 8 wherein said lower armature further includes an upper cross member extending between said upstanding tubes at the terminal ends of said tubes opposite said lower cross member of said seatback frame.

11. The vehicle seat assembly as set forth in claim 3 wherein said upper armature includes a main support member extending in a generally transverse direction relative to said side members of said seatback frame and a pair of depending tubular legs spaced relative to one another and extending from said main support member in the general direction of said lower armature.

12. The vehicle seat assembly as set forth in claim 11 wherein said upper armature further includes an upper suspension mechanism that extends between said depending legs of said upper armature and that provides thoracic support for the occupant of said seat assembly.

13. The vehicle seat assembly as set forth in claim 12 wherein said upper armature further includes a pair of upstanding tubular head rest supports fixed to said main support member in spaced relationship with respect to one another and extending in the general direction of said upper cross member of said seatback frame, said head rest being operably mounted to said pair of upstanding tubular head rest supports for coordinated movement with the movement of said upper armature.

14. The vehicle seat assembly as set forth in claim 3 wherein said side impact protective strut includes a cross member welded to said lower cross member of said seatback frame.

15. The vehicle seat assembly as set forth in claim 3 wherein said side impact protection strut includes a cross member that is pivotally mounted to said side member of said seatback frame, said lower armature being mounted to said cross member of said side impact protection strut, said linkage including a drag link for providing linear movement of said upper and lower armatures relative to each other.

16. The vehicle seat assembly comprising:
a seatback frame and an active head restraint system operatively supported by said seatback frame, said head restraint system including a head rest, an upper armature, a lower armature and a linkage operatively interconnecting said upper and lower armatures;
said seatback frame including a pair of side members spaced relative to one another and upper and lower cross members extending therebetween;
said upper armature pivotally mounted relative to said seatback frame so as to be generally aligned with the thoracic area of the occupant of said seat assembly, said head rest being operatively mounted to said upper armature, said upper armature including a main support member extending in a generally transverse direction relative to said side members of said seatback frame and a pair of depending tubular legs spaced relative to one another and extending from said main support member in the general direction of said lower armature, an upper suspension mechanism extends between said depending legs of said upper armature and provides thoracic support for the occupant of said seat assembly;
said lower armature pivotally mounted to said seatback frame in spaced relationship relative to said upper armature so as to be generally aligned with the pelvic and lumbar regions of the occupant of the seat assembly, said lower armature including a pair of upstanding tubes and a lower suspension mechanism extending between said pair of upstanding tubes for providing lumbar support to the occupant of said assembly;
said lower armature being operative to absorb energy generated by a force exceeding a predetermined level at the pelvic and lumbar regions such that said lower armature acts on said upper armature through said linkage to cause said upper armature and said head rest to pivot upwardly and forwardly to move said head rest toward the head of the occupant of said seat assembly in an initial response to an impact exceeding a predetermined force; and
said upper armature further operable to absorb energy generated by a force exceeding a predetermined level at the thoracic region such that said upper armature and said head rest pivots further upwardly and forwardly following the initial response by said lower armature to an impact that exceeds a predetermined force.

17. The vehicle seat assembly as set forth in claim 16 wherein said seatback frame includes a side impact protective strut extending transverse to said side members in the space there-between and proximate to said lower cross member for providing added strength to said seat assembly in the transverse direction relative to said side members and in the lumbar region relative to an occupant of said seat assembly.

18. The vehicle seat assembly as set forth in claim 17 wherein said side impact protective strut includes a cross member welded to said lower armature.

19. The vehicle seat assembly as set forth in claim 17 wherein said side impact protective strut includes a cross member welded to said lower cross member of said seatback frame.

20. The vehicle seat assembly as set forth in claim 17 wherein said side impact protection strut includes a cross member that is pivotally mounted to said side member of said seatback frame, said lower armature being mounted to said cross member of side impact protective strut, said linkage including a drag link for providing linear movement of said upper and lower armatures relative to each other.

* * * * *

UNITED STATES PATENT AND TRADEMARK OFFICE
CERTIFICATE OF CORRECTION

PATENT NO. : 6,789,845 B2
DATED : September 14, 2004
INVENTOR(S) : Farquhar et al.

It is certified that error appears in the above-identified patent and that said Letters Patent is hereby corrected as shown below:

Column 3,
Delete lines 38 - 41 and insert the following paragraph before line 18, -- Other advantages of the invention will be readily appreciated as the same becomes better understood by reference to the following detailed description when considered in connection with the accompanying drawings, wherein: --.

Column 9,
Line 22 and 26, delete "an" and insert therefor -- a --.

Column 10,
Line 1, delete "The" and insert therefor -- A --.

Signed and Sealed this

Third Day of May, 2005

JON W. DUDAS
*Director of the United States Patent and Trademark Office*